Patented Aug. 6, 1929.

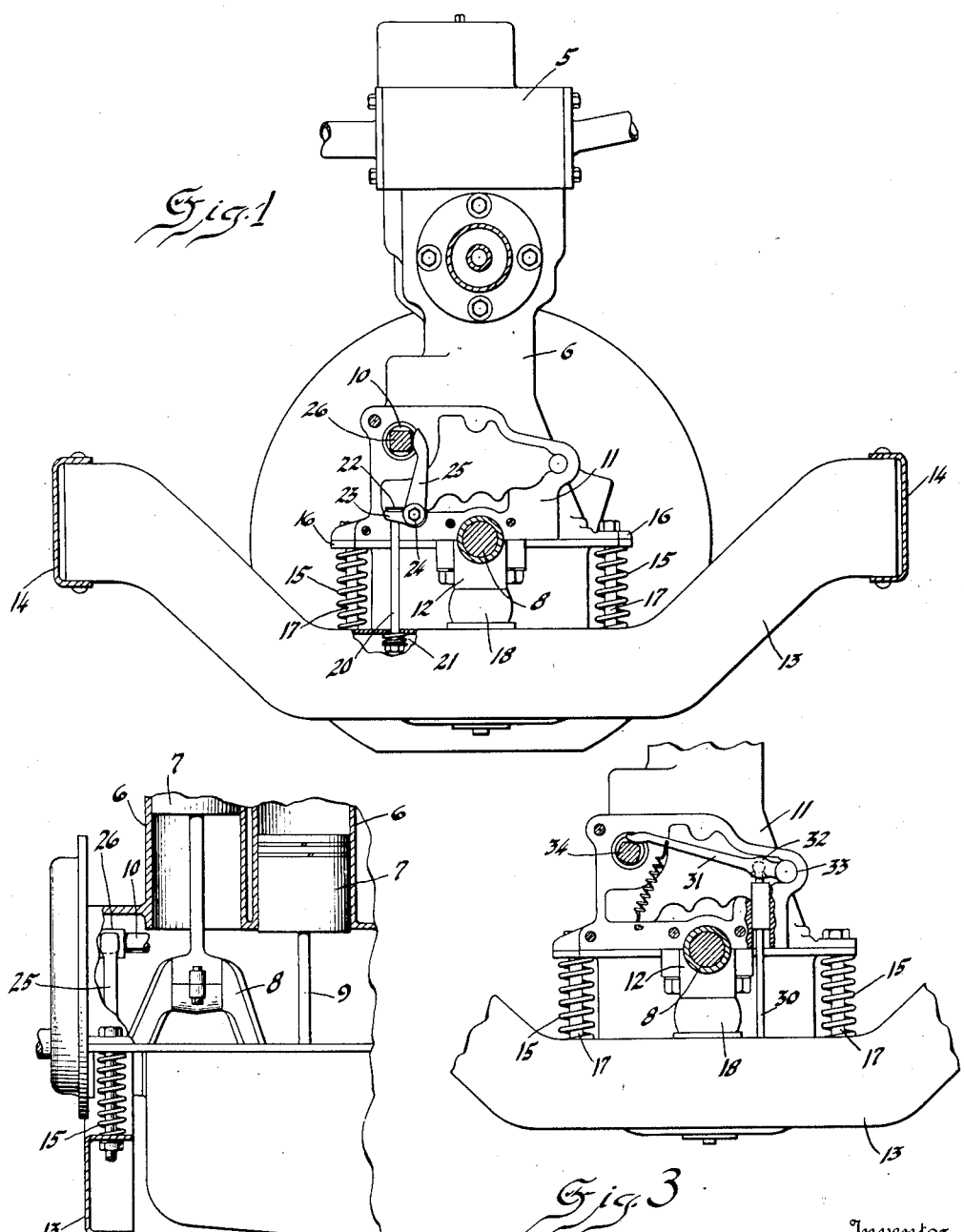

1,723,430

UNITED STATES PATENT OFFICE.

ROGER KENNETH LEE, OF DETROIT, MICHIGAN, ASSIGNOR TO GENERAL MOTORS RESEARCH CORPORATION, OF DETROIT, MICHIGAN, A CORPORATION OF DELAWARE.

SYNCHRONOUS MOTOR MOUNTING.

Application filed February 21, 1927. Serial No. 169,907.

The invention relates to a mounting for engines or other machines which are subject to vibrations synchronous with some moving part of the machine. While in some respects of more general application, the mounting is especially designed for use in connection with, and will be herein described as applied to, a support for a reciprocating engine of the conventional four cylinder type. In this type of engine the four cylinders are usually positioned in the same plane on the same side of the crank shaft and the pistons are connected to the crank shaft by connecting rods, the four throws of the shaft being in a single plane and so arranged that the two end pistons travel oppositely to the two intermediate pistons. In such an engine the primary inertia forces due to the reciprocating parts are neutralized by reason of the opposed effect of the oppositely traveling pistons. The secondary inertia forces, however, which act in the plane of the cylinders and at a frequency twice that of the primary forces, together with the rocking effect due to piston inertia torque, tend to cause vibrations of the engine and its supports.

The vibrations thus set up will have a fixed amplitude in a given engine, and may be calculated or determined empirically for each point of support of the engine. If, therefore, the engine be so supported that it will be permitted to move, relative to its base or supports, at each point of support, through the distance and in the direction which corresponds to the amplitude of the vibrations in question, then there will be no varying force exerted upon the base by reason of the vibrations of the engine itself. The object of the invention, accordingly, is to provide a means for connecting the engine to its base or supports which permits of such movement of the engine.

In the drawings, illustrating the application of the invention to an internal combustion engine constituting part of the power plant of an automobile, Fig. 1 is an elevation, partly in section, showing an engine supported upon a cross member of an automobile frame.

Fig. 2, is a fragmentary view showing in longitudinal section parts of the structure shown in Fig. 1, and Fig. 3 is a view similar to Fig. 1 showing parts of a modified construction.

Referring to the drawings, 5 indicates the engine block of an engine of the conventional type above referred to, having vertical cylinders 6, pistons 7, crank shaft 8 and connecting rods 9. An additional shaft 10, which may be the engine cam shaft, is shown, which is designed to be actuated by any usual or suitable means, its speed of rotation being usually one-half that of the crank shaft. The crank shaft is mounted in bearings 12 carried by the crank case 11. The unbalanced forces due to the reciprocating parts will act through the crank shaft and its bearings upon the casing thus tending to cause the latter, and the parts supported thereby, to vibrate in a vertical plane at its points of support.

In the power plant assembly illustrated, the engine is carried upon a cross-member 13 secured at its ends to side frame members 14. The engine is supported from the cross-member 13 by springs 15 which rest at their lower ends upon the upper flange of cross member 13 and upon the upper ends of which the flanges 16 of the crank case are seated. Bolts 17 serve to secure the parts in assembled relation while permitting the crank case to move downwardly in opposition to the resistance of springs 15. The springs are of such strength, however, that they will normally exert an upward force in excess of that required to oppose the weight of the engine. A rubber block 18 may be provided below the bearing 12 to insure that abnormal shocks shall not cause any undesired downward movement of the engine.

Movement of the engine upwardly in response to the force exerted by springs 15 is limited by a tension member or rod 20, the lower end of which is attached to the frame member 13. The rod may, as shown, be passed through an aperture in the flange of member 13 and be provided with a nut on the lower end acting against the frame member, preferably through a yielding connection, as by the spring 21. The upper end of the rod is provided with a head 22 whereby it is pivotally connected to one arm 23 of an elbow lever, pivoted at 24 on the crank case. The other arm 25 of the lever engages at its extremity with a cam 26 mounted upon the cam shaft 10. This cam should be provided with the number of cam projections necessary to produce oscillations of the lever arm 25 in synchronism with the vibrations whose effect is to be neutralized. Assuming that the vibrations occur at twice the frequency of the crank shaft revolutions, and that the shaft 10 is driven at one-half crank shaft speed, then the cam 26 should have, as shown, four cam projections.

In the position of the parts as illustrated, it will be noted that the upward movement of the engine under the influence of springs 15 will be controlled and limited by the tension member 20 acting upon the lever arm 23 whose movement is limited by engagement of the lever arm 25 with cam 26. Hence, as the cam rotates, the lever, acting through its pivot upon the crank case, will cause movement of the crank case alternately upwardly and downwardly.

The angular location and number of the cam projections on cam 26, the proportions of the lever arms, the location of the pivot 24 on the crank case, and other details must, of course, be so selected that the movement permitted by the supporting means coincides in amplitude, direction and timing with the vibrations which it is desired to counteract. The engine being thus permitted to move relatively to the supporting member, as the frame 13, the energy of the vibratory movements is not transmitted to the frame and does not appear in the form of vibration of parts of the vehicle or other structure on which the engine is mounted.

Since the vibrations in an engine of the character described appear chiefly at the front end of the crank case, it may be sufficient to provide movable connections at that end only, the rear end being attached to the vehicle frame or other support by mere flexible connections not arranged to positively move the engine relative to the frame.

In the form illustrated in Fig. 3, the tension member corresponding to member 20 of Fig. 1 is indicated by 30. This member is connected to lever 31 by a pivotal connection, as by a ball joint 32. The lever in this form is pivoted at the end, as at 33, in a seat in the crank case 11 and engages at the other end against the cam 34 corresponding in mounting and function to the cam 26 of Fig. 1. The operation will be substantially the same as in the form previously described.

I claim:

1. A mounting for a machine subject to vibrations including, in combination with the machine, a support therefor, the machine being so supported as to tend constantly to move away from said support, means restraining the movement away from the support, and means acting on said restraining means to permit alternating variations in the distance of the machine from the support in synchronism with said vibrations.

2. An engine mounting comprising, in combination with an engine, a support therefor, means tending constantly to move the engine away from the support, means restraining such movement, and means acting on said restraining means to permit the engine to move toward and from the support in synchronism with vibrations of the engine whereby to reduce transmission to the support of the energy of such vibrations.

3. An engine mounting comprising, in combination with an engine, a support therefor, tension means connecting the engine to the support and arranged to limit the movement of the engine away from the support, and means cooperating with said tension means to permit the engine to move toward and from said support in synchronism with vibrations of said engine.

4. Structure as set forth in claim 3, including a lever to which said tension means is connected and means acting to cause oscillation of said lever.

5. Structure as set forth in claim 3 including means actuated by a moving part of the engine for effecting movement of the engine.

6. Structure as set forth in claim 3 including means actuated by the engine cam shaft acting upon said tension, means for effecting the movement of the engine.

7. The combination with a machine having inherent vibrations, a support for said machine, springs acting between said machine and support tending to raise the machine from the support, means connecting the machine and support limiting the movement of the machine away from the support, and means acting on said connecting means to vary the distance between said machine and support in synchronism with such vibrations.

8. Structure as set forth in claim 7, said distance varying means being actuated by a moving part of the machine.

9. The combination with an engine and a base therefor of spring means acting between said base and said engine and under such compression as to tend to move the engine away from the base, means connecting the engine and base and restraining movement of the engine away from the base and means acting upon said connecting means to vary the same synchronously with vibrations of the engine to an extent and in a direction to permit such vibrations without transmitting the energy of the vibratory movement to the base through said connecting means.

In testimony whereof I affix my signature.

ROGER K. LEE.